United States Patent
Yuasa

(10) Patent No.: US 9,711,995 B2
(45) Date of Patent: Jul. 18, 2017

(54) POWER TRANSMISSION DEVICE AND POWER RECEIVING DEVICE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 14/699,610

(22) Filed: Apr. 29, 2015

(65) Prior Publication Data

US 2015/0364924 A1    Dec. 17, 2015

(30) Foreign Application Priority Data

Jun. 11, 2014    (JP) .................................. 2014-120366

(51) Int. Cl.
*H01F 27/42*    (2006.01)
*H02J 7/02*    (2016.01)
(Continued)

(52) U.S. Cl.
CPC ............. *H02J 7/025* (2013.01); *B60L 11/182* (2013.01); *B60L 11/1829* (2013.01); *B60L 11/1833* (2013.01); *H01F 27/02* (2013.01); *H01F 27/40* (2013.01); *H01F 38/14* (2013.01); *H02J 7/0042* (2013.01); *H02J 50/10* (2016.02); *B60L 2230/10* (2013.01); *H01F 27/025* (2013.01); *Y02T 10/7005* (2013.01); *Y02T 10/7088* (2013.01);
(Continued)

(58) Field of Classification Search
CPC  H01F 27/02; H01F 38/14; H02J 50/10; H02J 7/0042; B60L 11/1829; B60L 2230/10; Y02T 10/7088
USPC .......................................................... 307/104
See application file for complete search history.

(56) References Cited

U.S. PATENT DOCUMENTS 4,960,983 A  * 10/1990  Inoue ................. G06K 7/10336
                                                          235/449
5,550,452 A  *  8/1996  Shirai ..................... H02J 7/025
                                                          320/108
(Continued)

FOREIGN PATENT DOCUMENTS

AU    2006269374 B2    1/2007
AU    2006269374 C1    1/2007
(Continued)

*Primary Examiner* — Jared Fureman
*Assistant Examiner* — Duc M Pham
(74) *Attorney, Agent, or Firm* — Oliff PLC

(57) ABSTRACT

A power transmission device for transmitting power to a power receiving device in a noncontact manner, including: a power transmission unit for transmitting power to the power receiving device in a noncontact manner; a power supply unit, connected to an external power supply, for supplying power to the power transmission unit, and a housing housing the power transmission unit and the power supply unit, wherein the power supply unit includes first devices disposed around the power transmission unit, and a second device disposed between the power transmission unit and a bottom surface, in a state where the power transmission unit and the power supply unit are mounted on the bottom surface of the housing, and a height of each of the first devices from the bottom surface is higher than a height of the second device from the bottom surface.

12 Claims, 10 Drawing Sheets

(51) Int. Cl.
*H01F 27/02* (2006.01)
*H01F 27/40* (2006.01)
*H01F 38/14* (2006.01)
*B60L 11/18* (2006.01)
*H02J 7/00* (2006.01)
*H02J 50/10* (2016.01)

(52) U.S. Cl.
CPC .............. *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 6,219,267 | B1 | 4/2001 | Andres |
| 7,741,734 | B2 | 6/2010 | Joannopoulos et al. |
| 2007/0222542 | A1 | 9/2007 | Joannopoulos et al. |
| 2008/0278264 | A1 | 11/2008 | Karalis et al. |
| 2009/0195332 | A1 | 8/2009 | Joannopoulos et al. |
| 2009/0195333 | A1 | 8/2009 | Joannopoulos et al. |
| 2009/0224856 | A1 | 9/2009 | Karalis et al. |
| 2009/0267709 | A1 | 10/2009 | Joannopoulos et al. |
| 2009/0267710 | A1 | 10/2009 | Joannopoulos et al. |
| 2010/0096934 | A1 | 4/2010 | Joannopoulos et al. |
| 2010/0102639 | A1 | 4/2010 | Joannopoulos et al. |
| 2010/0102640 | A1 | 4/2010 | Joannopoulos et al. |
| 2010/0102641 | A1 | 4/2010 | Joannopoulos et al. |
| 2010/0117455 | A1 | 5/2010 | Joannopoulos et al. |
| 2010/0117456 | A1 | 5/2010 | Karalis et al. |
| 2010/0123353 | A1 | 5/2010 | Joannopoulos et al. |
| 2010/0123354 | A1 | 5/2010 | Joannopoulos et al. |
| 2010/0123355 | A1 | 5/2010 | Joannopoulos et al. |
| 2010/0127573 | A1 | 5/2010 | Joannopoulos et al. |
| 2010/0127574 | A1 | 5/2010 | Joannopoulos et al. |
| 2010/0127575 | A1 | 5/2010 | Joannopoulos et al. |
| 2010/0133918 | A1 | 6/2010 | Joannopoulos et al. |
| 2010/0133919 | A1 | 6/2010 | Joannopoulos et al. |
| 2010/0133920 | A1 | 6/2010 | Joannopoulos et al. |
| 2010/0171370 | A1 | 7/2010 | Karalis et al. |
| 2010/0181844 | A1 | 7/2010 | Karalis et al. |
| 2010/0187911 | A1 | 7/2010 | Joannopoulos et al. |
| 2010/0201205 | A1 | 8/2010 | Karalis et al. |
| 2010/0207458 | A1 | 8/2010 | Joannopoulos et al. |
| 2010/0225175 | A1 | 9/2010 | Karalis et al. |
| 2010/0231053 | A1 | 9/2010 | Karalis et al. |
| 2010/0237706 | A1 | 9/2010 | Karalis et al. |
| 2010/0237707 | A1 | 9/2010 | Karalis et al. |
| 2010/0237708 | A1 | 9/2010 | Karalis et al. |
| 2010/0253152 | A1 | 10/2010 | Karalis et al. |
| 2010/0264745 | A1 | 10/2010 | Karalis et al. |
| 2013/0127409 | A1 | 5/2013 | Ichikawa |
| 2013/0193749 | A1 | 8/2013 | Nakamura et al. |
| 2014/0055089 | A1* | 2/2014 | Ichikawa ................ H01F 38/14 320/108 |
| 2014/0285030 | A1* | 9/2014 | Nakamura ............... H02J 5/005 307/104 |
| 2015/0244181 | A1* | 8/2015 | Kagami .................. H01F 27/36 307/104 |
| 2015/0326055 | A1 | 11/2015 | Koyanagi et al. |
| 2016/0250934 | A1* | 9/2016 | Yuasa .................... H01F 38/14 307/104 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 103534771 A | 1/2014 |
| DE | 202012101853 U1 | 8/2013 |
| EP | 1 902 505 A2 | 3/2008 |
| EP | 2 130 287 A1 | 12/2009 |
| FR | 2621147 A1 | 3/1989 |
| IN | 735/DELNP/2008 | 5/2008 |
| IN | 6195/DELNP/2009 | 7/2010 |
| JP | 2009-501510 A | 1/2009 |
| JP | 2010-268660 A | 11/2010 |
| JP | 2012-244722 A | 12/2012 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-011332 A | 1/2014 |
| JP | 2014-011939 A | 1/2014 |
| KR | 2008-0031398 A | 4/2008 |
| KR | 2010-0015954 A | 2/2010 |
| WO | 98/27561 A1 | 6/1998 |
| WO | 2007/008646 A2 | 1/2007 |
| WO | 2008/118178 A1 | 10/2008 |
| WO | 2012/157114 A1 | 11/2012 |
| WO | 2013-108108 A2 | 7/2013 |
| WO | 2014/002372 A1 | 1/2014 |

* cited by examiner

POWER TRANSMISSION DEVICE AND POWER RECEIVING DEVICE

This nonprovisional application is based on Japanese Patent Application No. 2014-120366 filed on Jun. 11, 2014, with the Japan Patent Office, the entire contents of which are hereby incorporated by reference.

BACKGROUND OF THE INVENTION

Field of the Invention

The present invention relates to a power transmission device for transmitting power to a power receiving device in a noncontact manner, and a power receiving device for receiving power from a power transmission device in a noncontact manner.

Description of the Background Art

As disclosed in Japanese Patent Laying-Open Nos. 2013-154815, 2013-146154, 2013-146148, 2013-110822, and 2013-126327, there have been known power transmission systems using power transmission devices and power receiving devices for transmitting and receiving power in a noncontact manner. Japanese Patent Laying-Open Nos. 2014-011939 and 2014-011332 each describe a configuration in which a coil unit including ferrite and a coil, and a capacitor connected to the coil are provided, and the capacitor is housed in the same housing where the coil unit is housed.

SUMMARY OF THE INVENTION

According to the configuration of each of the above prior art documents, in the power transmission device, a high frequency power source and the like need to be provided in addition to the capacitor and the coil unit. Therefore, a management side of a charging station needs to install not only a power transmission device but also a high frequency power source.

In the power transmission device described in Japanese Patent Laying-Open No. 2014-011939, the capacitor is disposed at a position adjacent to the coil unit. Similarly to this mounting method, when peripheral devices such as a high frequency power source are disposed around the coil unit, a size of a housing horizontally increases, and an installation area increases.

On the other hand, when the peripheral devices are simply disposed on the lower surface side of the coil unit, a height of the coil unit becomes higher than a height of the capacitor disposed around the coil unit, and the coil unit largely protrudes upward. In a state where an upper surface of the coil unit relatively protrudes upward, when a vehicle runs on the power transmission device, a large load is applied to the coil unit from wheels. A problem that the coil unit includes a ferrite core, and is damaged due to the application of the large load is caused.

Also in the power receiving device, in a case where the coil unit largely protrudes downward beyond devices disposed around the coil unit, a problem that when the power receiving device comes into contact with unevenness (e.g., a railroad crossing) of the ground, a falling object on the ground, or other obstacle, the coil unit is damaged is caused.

The present invention has been made in view of the above problems, and an object of the present invention is to provide a power transmission device and a power receiving device, each of which suppresses increase in size in a case where peripheral devices are housed in a single housing to be integrated, and suppresses damage of a coil unit when external power from wheels of a vehicle is applied.

According to this power transmission device, the power supply unit includes first devices disposed around the power transmission unit, and a second device disposed between the power transmission unit and the bottom surface of the housing, in a state where the power receiving unit and the apparatus unit are mounted on the bottom surface of the housing, and a height of each of the first devices from the bottom surface of the housing is higher than a height of the second device from the bottom surface.

According to this power transmission device, an upper surface of the power transmission unit is approximate to a height of an upper surface of each of the first devices located around the power transmission unit, so that the upper surface of the power transmission unit can be inhibited from protruding upward. Consequently, even when wheels of a vehicle run on the power transmission device, a large load can be inhibited from being applied to the power transmission unit. Furthermore, the second device is disposed on a lower surface of the power transmission unit, the height of each first device disposed around the power transmission unit is made higher, and installation areas of the first devices are reduced, so that an installation area of a whole of the power transmission device can be inhibited from increasing.

According to this power receiving device, the apparatus unit includes first devices disposed around the power receiving unit, and a second device disposed between the power receiving unit and a bottom surface of the housing, in a state where the power receiving unit and the apparatus unit are mounted on the bottom surface of the housing, and a height of each of the first devices from the bottom surface of the housing is higher than a height of the second device from the bottom surface of the housing.

According to this power receiving device, the power receiving unit is inhibited from largely protruding downward beyond the first devices located around the power receiving unit. Consequently, even when the power receiving device interferes with the ground, a large load is inhibited from being applied to the power receiving unit. Furthermore, the second device is disposed on a lower surface of the power receiving unit, and the height of each first device disposed around the power receiving unit is made higher, and installation areas of the first devices are reduced, so that an installation area of a whole of the power receiving device is inhibited from increasing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
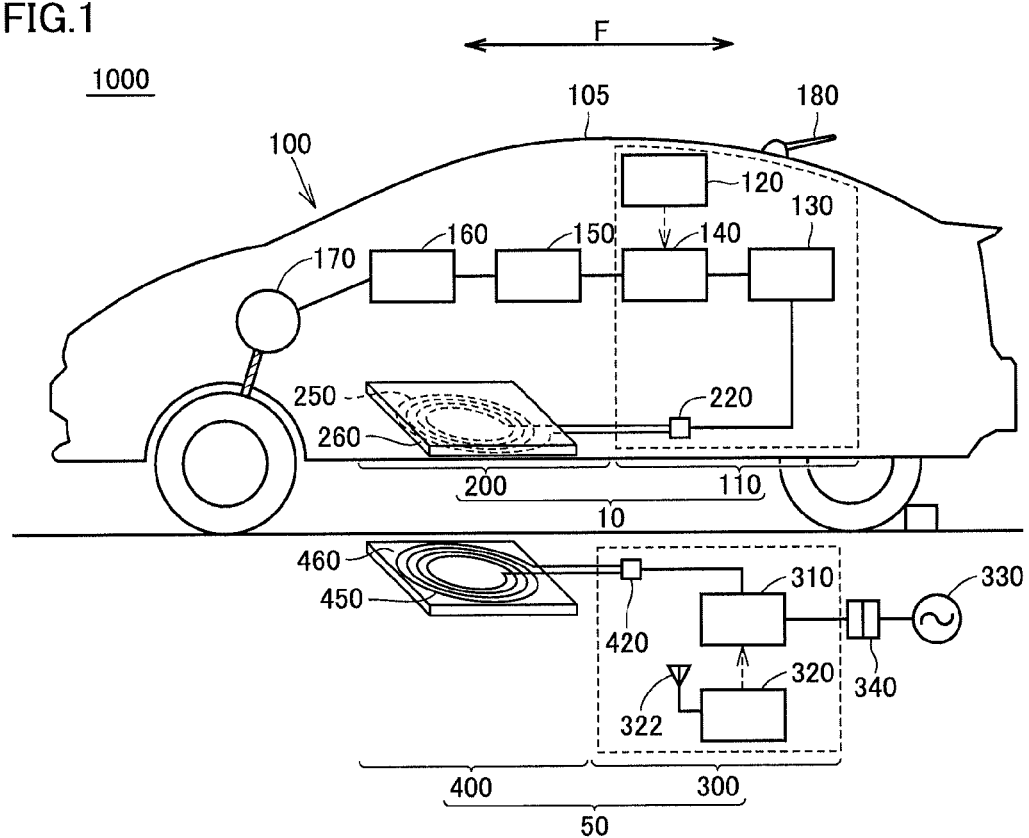
FIG. 1 is a diagram showing a power transmission system in a first embodiment.

Exemplified embodiments based on the present invention are hereinafter described with reference to the drawings. In the following embodiments, when a number, an amount or the like is mentioned, the scope of the present invention is not necessarily limited to the number, the amount or the like, unless otherwise specified. The same reference numerals denote the same or corresponding components, and overlapping description may not be repeated. It is intended from the beginning to appropriately combine and use the configurations in the embodiments. In the drawings, illustration is not performed at actual dimension ratios, but performed at the partially different ratios in order to facilitate understanding of the structure.

A configuration of a power transmission device installed on a facility side (parking area or the like), mainly described below, is applicable also to a power receiving device mounted on a vehicle side. In the power transmission device, a bottom surface side means the facility (ground) side, and a front surface side means a power receiving device (vehicle) side. On the other hand, in the power receiving device, a bottom surface side means the vehicle side, and a front surface side means a power transmission device (ground) side.

In each of the drawings used below, a direction shown by an arrow F in the drawing indicates an entry direction and an advancing direction (including retreating) of a vehicle, and a direction shown by an arrow W in the drawing indicates a width direction of the vehicle.

First Embodiment

Power Transmission System 1000

With reference to FIG. 1, a power transmission system 1000 for transmitting power in a noncontact manner will be described. Power transmission system 1000 includes a power receiving device 10 mounted on an electric vehicle 100, and a power transmission device 50 installed on a facility side such as a parking area. Electric vehicle 100 includes power receiving device 10 and a vehicle body 105.

(Power Receiving Device 10)

Power receiving device 10 includes a power receiving unit 200, and an apparatus unit 110 provided between power receiving unit 200 and a battery 150 serving a storage device for storing power received by power receiving unit 200. Power receiving unit 200 has a power receiving coil 250 and a plate shaped ferrite core 260. As described later, as power receiving coil 250, any of a spiral type coil (see FIG. 2) and a wound type coil (see FIG. 3) may be employed. FIG. 1 shows spiral type power receiving coil 250. Apparatus unit 110 has a capacitor 120, a rectifier 130, a DC/DC converter 140, and the like. Power receiving coil 250 and a capacitor 220 are connected in series in the drawing, but may be connected in parallel.

Vehicle body 105 includes battery 15 connected to DC/DC converter 140 of apparatus unit 100, a power control unit 160, a motor unit 170, a communication unit 180, and the like.

The number of turns of power receiving coil 250 is appropriately set so as to increase a distance between power receiving coil 250 and a power transmission coil 450 described later, a Q value (e.g., Q≥100) showing resonance strength of power receiving coil 250 and power transmission coil 450, a coupling coefficient is showing a coupling degree of the resonance strength, and the like. Power receiving coil 250 is connected to rectifier 130. Rectifier 130 converts an AC current supplied from power receiving unit 200 into a DC current, to supply the converted DC current to DC/DC converter 140.

(Power Transmission Device 50)

Power transmission device 50 includes a power transmission unit 400 and a power supply unit 300. Power transmission unit 400 has power transmission coil 450 and a plate shaped ferrite core 460. As power transmission coil 450, any of a spiral type coil (see FIG. 2) and a wound type coil (see FIG. 3) may be employed. FIG. 1 shows spiral type power transmission coil 450. Power supply unit 300 includes a capacitor 420, a high frequency power device 310, a power transmission ECU 320, and a communication unit 322. Power supply unit 300 is detachably connected to an AC power supply 330 by using an outlet plug 340 or the like. Power transmission coil 450 and capacitor 420 are connected in series in the drawing, but may be connected in parallel.

High frequency power device 310 converts power received from AC power supply 330 into high-frequency power, to supply the converted high-frequency power to power transmission coil 450. Power transmission coil 450 transmits power to power receiving coil 250 of power receiving unit 200 in a noncontact manner by electromagnetic induction.

(Details of Power Transmission Device 50)

Figure 2:
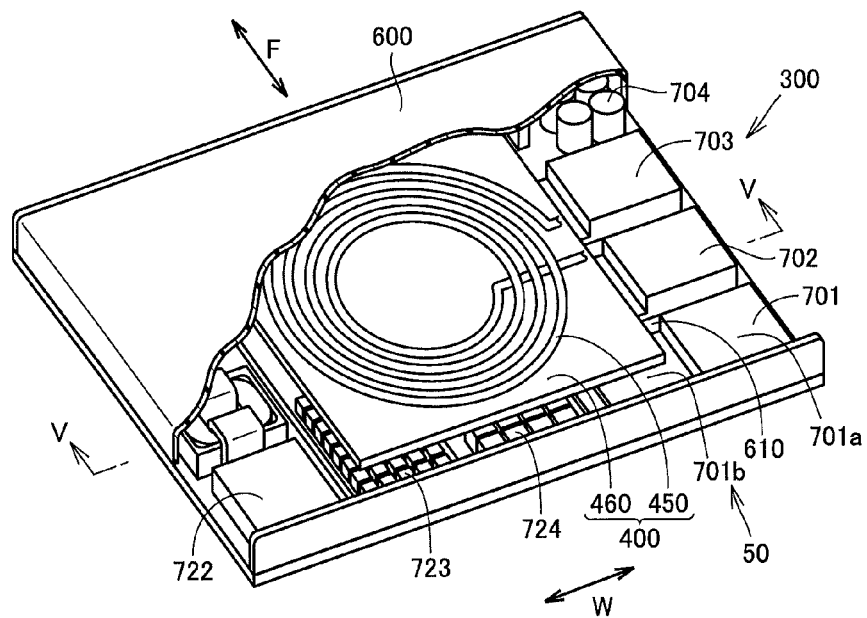
FIG. 2 is a perspective view showing a configuration of a power transmission device employing a spiral type coil, in the first embodiment.
Figure 3:
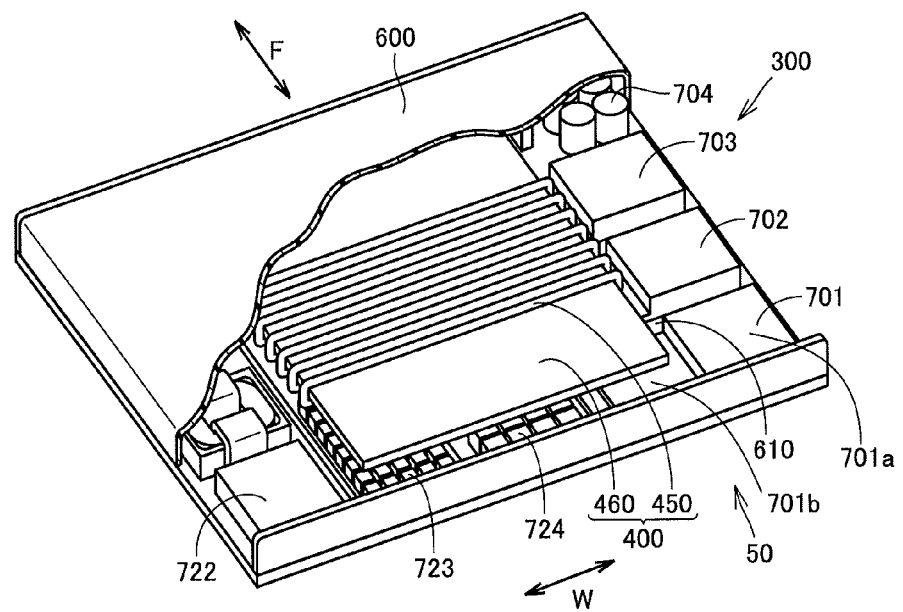
FIG. 3 is a perspective view showing a configuration of a power transmission device employing a wound type coil, in the first embodiment.
Figure 4:
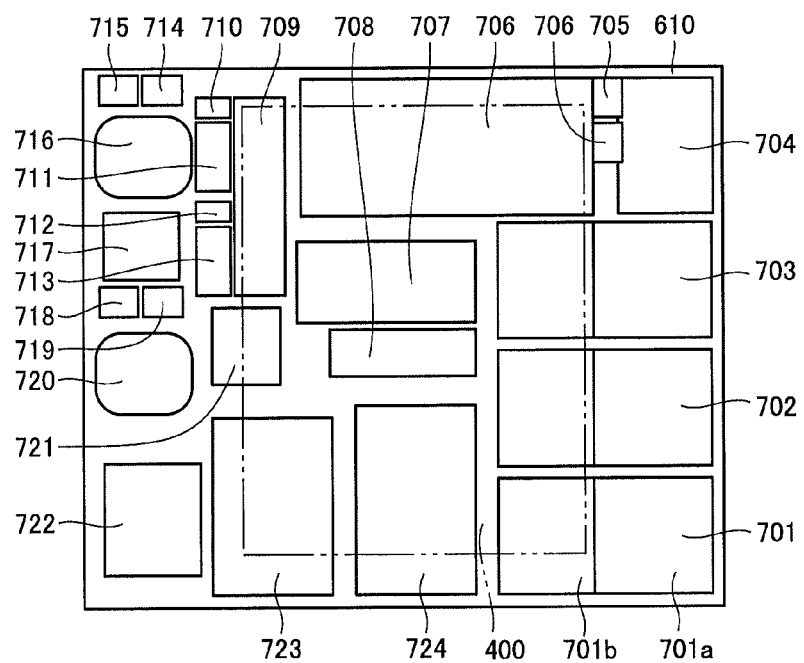
FIG. 4 is a diagram showing placement of various devices of a power supply unit of the power transmission device in the first embodiment.
Figure 5:
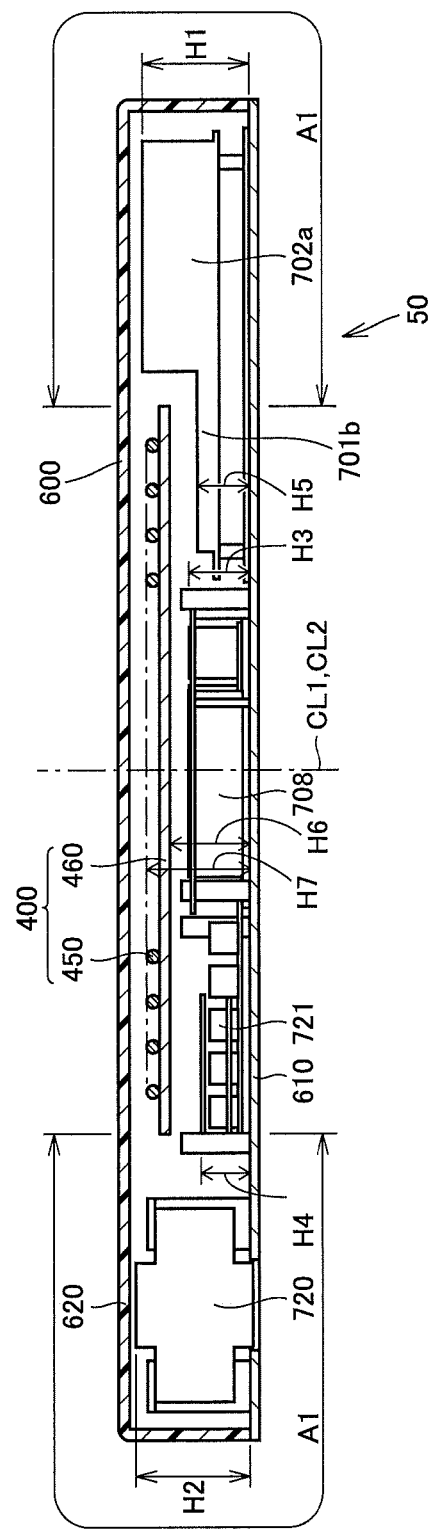
FIG. 5 is a sectional view taken along a line V-V in FIG. 2.
Figure 6:
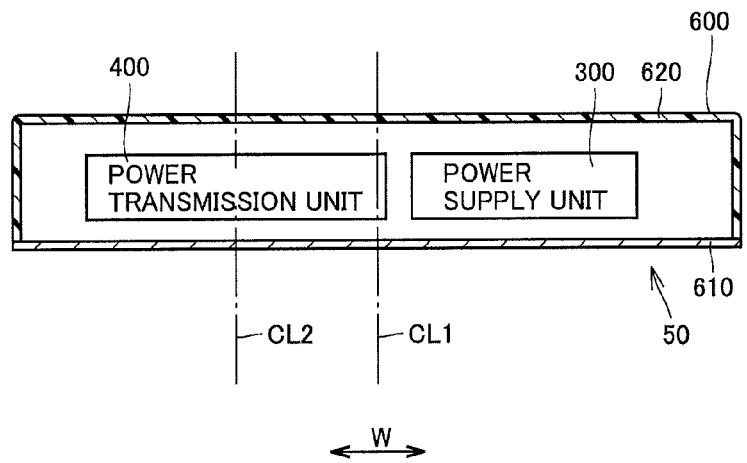
FIG. 6 is a sectional view corresponding to the view taken along line V-V in FIG. 2, in a related art.

With reference to FIGS. 2 to 6, a detailed configuration of power transmission device 50 according to this embodiment will be described. FIG. 2 is a perspective view showing a configuration of power transmission device 50 employing a spiral type coil as the power transmission coil, FIG. 3 is a perspective view showing a configuration of power transmission device 50 employing a wound type coil as the power transmission coil, FIG. 4 is a diagram showing placement of various devices of power supply unit 300, FIG. 5 is a sectional view taken along a line V-V in FIG. 2, and FIG. 6 is a sectional view corresponding to the view taken along line V-V in FIG. 2, in a related art.

Power transmission device 50 has power transmission unit 400 for transmitting power to power receiving device 10 in a noncontact manner, and power supply unit 300, connected to the external power supply, for supplying power to power transmission unit 400, as described above, and these power transmission unit 400 and power supply unit 300 are housed in a housing 600. Accordingly, power transmission device 50 according to this embodiment has a configuration in which power transmission unit 400 and power supply unit 300 are integrated.

With reference to FIGS. 2 and. 3, in this embodiment, power supply unit 300 includes high frequency power device 310, power transmission ECU 320, and communication unit 322, as shown in FIG. 1, and components configuring these devices are switching power supplies 701, 702 and 703, a PFC sub-board 704, a fan 705, a DC/RF unit 706, a 5V/15V power supply 707, a 24V power supply 708, a resonance capacitor 709, a fan 710, a heat sink 711, a fan 712, a heat sink 713, fans 714 and 715, a filter inductor 716, a filter capacitor 717, fans 718 and 719, a filter inductor 720, a filter capacitor 721, a SCU 722, an interface 723, an input controller 724, and the like. Switching power supplies 701, 702 and 703 configure an AC/DC unit, filter inductors 716, 717 and 720, and filter capacitor 721 configure a filter unit, and DC/RF unit 706 configures a DC/RF unit. These devices are mounted on a bottom plate 610 configuring a bottom surface of housing 600.

With reference to FIGS. 4 and 5, in this embodiment, power supply unit 300 can be roughly classified into first devices disposed around power transmission unit 400, and second devices disposed between power transmission unit 400 and bottom plate 610 in a state where power transmission unit 400 and power supply unit 300 are mounted on the bottom plate of housing 600.

Herein, the "around power transmission unit 400" means that an area (A1) from an end of ferrite core 460 defining an outer shape of power transmission unit 400 to the outside, as shown in FIG. 5, and an area covered with ferrite core 460 in plan view is located at a position between power transmission unit 400 and bottom plate 610. These areas are similar to corresponding areas in power receiving unit 200 of power receiving device 10 described later.

The first devices disposed around power transmission unit 400 are a high part 701a of switching power supply 701, FC sub-board 704, fan 705, fan 710, heat sink 711, fan 712, heat sink 713, fan 714, 715, filter inductor 716, filter capacitor 717, fans 718 and 719, filter inductor 720, and the like.

The second devices disposed between power transmission unit 400 and bottom plate 610 are a low part 701b of switching power supply 701, 5V/15V power supply 707, 24V power supply 708, resonance capacitor 709, filter capacitor 721, interface 723, input controller 724, and the like.

Herein, as shown in FIG. 5, heights (H1, H2) of first devices 702a, 720, and the like from bottom plate 610 are higher than heights (H3, H4, H5) of second devices 702b, 708 and 721 from bottom plate 610. Also in switching power supply 701 which is the same device, low part 701b is provided to be lower than high part 701a.

Thus, the heights of the first devices disposed around power transmission unit 400 from bottom plate 610 are made higher than the heights of the second devices disposed between power transmission unit 400 and bottom plate 610 of housing 600. Consequently, a position of an upper surface of power transmission unit 400 located above the second devices is approximate to positions of the first devices disposed around power transmission unit 400, so that the upper surface of power transmission unit 400 can be inhibited from largely protruding upward. Consequently, even when wheels of the vehicle run on power transmission device 50, a load can be inhibited from concentrating on power transmission unit 400.

In power transmission device 50 according to this embodiment, difference (unevenness) between the heights of the devices housed in housing 60 is reduced, and a whole of housing 600 is formed in a thin flat shape, so that a load is inhibited from concentrating on a particular part of an upper surface of housing 600.

The first devices disposed around power transmission unit 400 and the second devices disposed between power transmission unit 400 and bottom plate 610, described above, are each an example, and are changed in accordance with a specification required for power transmission unit 400.

(Placement of Power Transmission Unit 400)

Herein, in power transmission device 50, in a case where power transmission unit 400 and power supply unit 300 are housed in housing 600, and power transmission unit 400 and power supply unit 300 are integrated, it is conceived that power transmission unit 400 is disposed on one side, and power supply unit 300 is disposed on the other side as shown in FIG. 6.

However, in a case where power transmission unit 400 and power supply unit 300 are disposed as shown in FIG. 6, a center position CL1 of housing 600 that is the center of power transmission device 50 deviates from a center position CL2 of power transmission unit 400.

Therefore, in this embodiment, a configuration in which the first devices disposed around power transmission unit 400 are disposed on both sides of power transmission unit 400 in a width direction of the vehicle (arrow W direction in the drawing) when viewed from an entry direction of the vehicle (arrow F direction in the drawing) is employed, as shown in FIGS. 2, 3 and 5.

In this embodiment, as the most preferable mode, a configuration in which center position CL1 of housing 600 that is the center of power transmission device 50 coincides with center position CL2 of power transmission unit 400 is employed. However, center position CL1 of housing 600 that is the center of power transmission device 50 does not always completely coincide with center position CL2 of power transmission unit 400. When compared to the configuration shown in FIG. 6, the configuration in which the first devices disposed around power transmission unit 400 are disposed on both sides of power transmission unit 400 in the width direction of the vehicle (arrow W direction in the drawing) when viewed from the entry direction of the vehicle (arrow F direction in the drawing) is employed.

By employing this configuration, it is possible to guide (drive) the vehicle based on center position CL1 of housing 600 in a case where the vehicle mounted with power receiving device 10 is aligned with power transmission device 50, and it is possible to easily align power receiving device 10 with power transmission device 50.

(Placement of Wound Type Power Transmission Coil 450)

Figure 7:
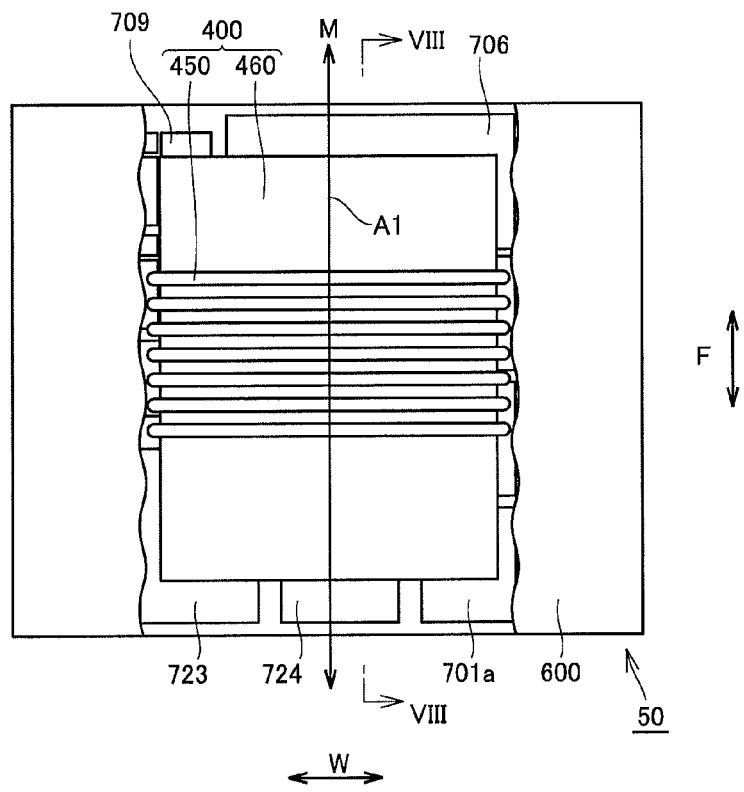
FIG. 7 is a diagram showing a direction of a magnetic flux in the wound type coil of the power transmission device.
Figure 8:
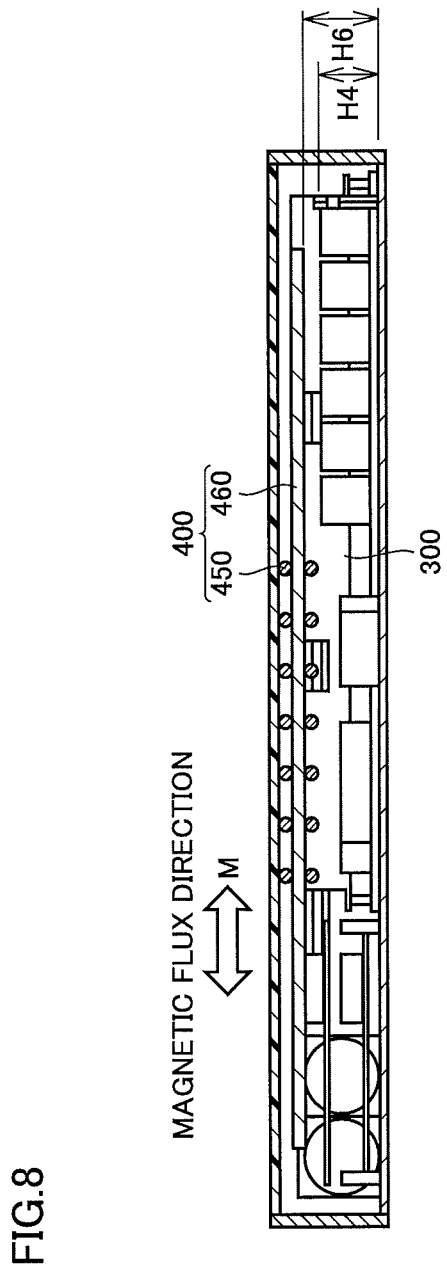
FIG. 8 is a sectional view taken along a line VIII-VIII in FIG. 7.
Figure 9:
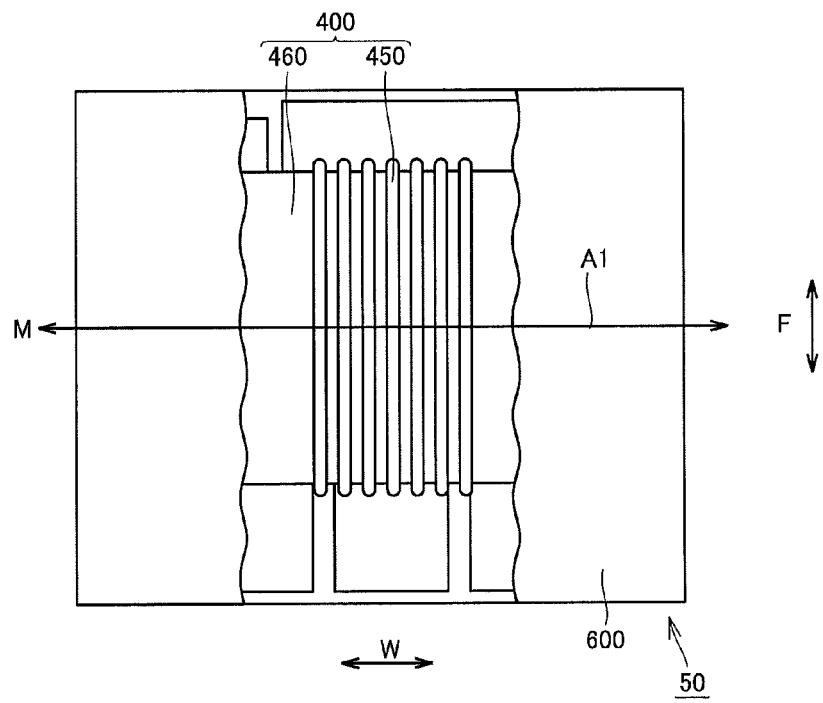
FIG. 9 is a diagram showing a direction of a magnetic flux in a case where placement of the wound type coil of the power transmission device is changed.

With reference to FIGS. 7 to 9, a case where a wound type power transmission coil 450 (see FIG. 3) is used in power transmission unit 400 of power transmission device 50 will be described. FIG. 7 is a diagram showing a direction of a magnetic flux M in wound type power transmission coil 450, FIG. 8 is a sectional view taken along a line VIII-VIII in FIG. 7, and FIG. 9 is a diagram showing a direction of magnetic flux M in a case where placement of wound type power transmission coil 450 is changed by 90°.

Also in a case where wound type power transmission coil 450 shown in FIG. 3 is employed, the heights of first devices disposed around power transmission unit 400 are made higher than the height of second devices disposed between power transmission unit 400 and bottom plate 610, similarly to the spiral type coil shown in FIG. 5.

With reference to FIGS. 5 and 7, in this embodiment, a height (H1) of each of the first devices located in a direction orthogonal to a winding axis A1 (arrow W direction in the drawing) from bottom plate 610 of housing 600 is made higher than heights (H3, H4 and H5) of the second devices from bottom plate 610 of housing 600. With reference to FIGS. 7 and 8, height (H4) of each of the first devices located in an axial direction of winding axis A1 from bottom plate 610 of housing 600 is made lower than a height (H6) from bottom plate 610 of housing 600 to a lower surface of ferrite core 460.

As shown in FIG. 7, height (H4) of each of the first devices located in the axial direction of winding axis A1 from bottom plate 610 of housing 600 is low by employing the above configuration. As a result, magnetic flux M generated in wound type power transmission coil 450 is inhibited from interlinking with the first devices located in F direction in the drawing, and temperatures of the first devices can be prevented from rising.

On the other hand, as shown in FIG. 9, in a case where placement of wound type power transmission coil 450 is changed by 90° (axial direction of winding axis A1 coincides with the width direction W of the vehicle), the high first devices exists in the axial direction of winding axis A1. As a result, magnetic flux M generated in wound type power transmission coil 450 easily interlinks with the first devices located in direction W in the drawing, there is a concern about rise in the temperatures of the first devices.

Height (H1) of each of the first devices located in the direction orthogonal to winding axis A1 (arrow W direction in the drawing) from bottom plate 610 of housing 600 is made higher than heights (H3, H5) of the second devices from bottom plate 610 of housing 600, so that difference (unevenness) between the heights of the devices housed in housing 60 is reduced, and a thin flat shape of the whole of housing 600 can be employed. As a result, even when wheels of the vehicle run on power transmission device 50, trampling force can be inhibited from concentrating on power transmission device 50.

Second Embodiment

Figure 10:
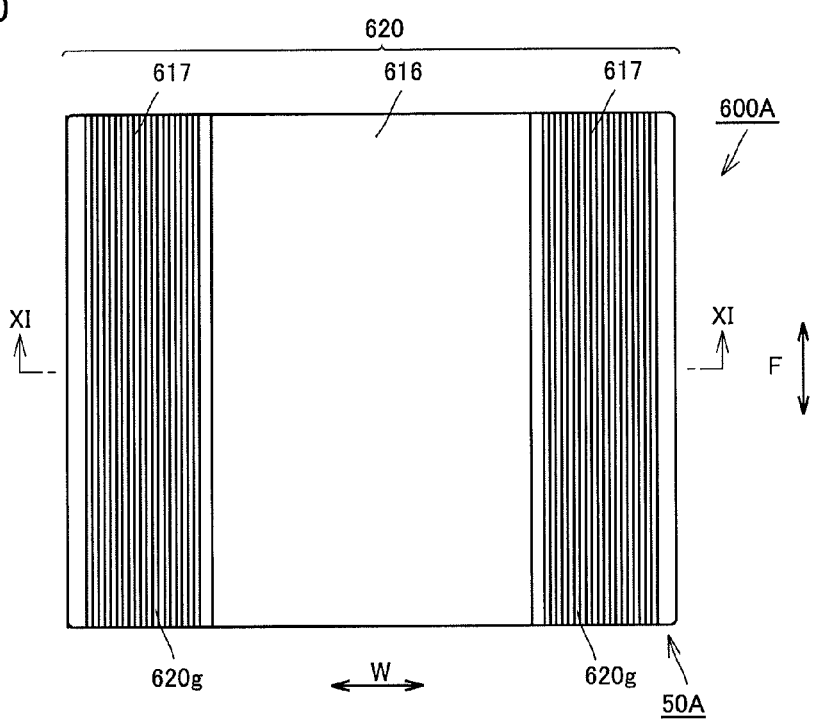
FIG. 10 is a plan view of a power transmission device in a second embodiment.
Figure 11:
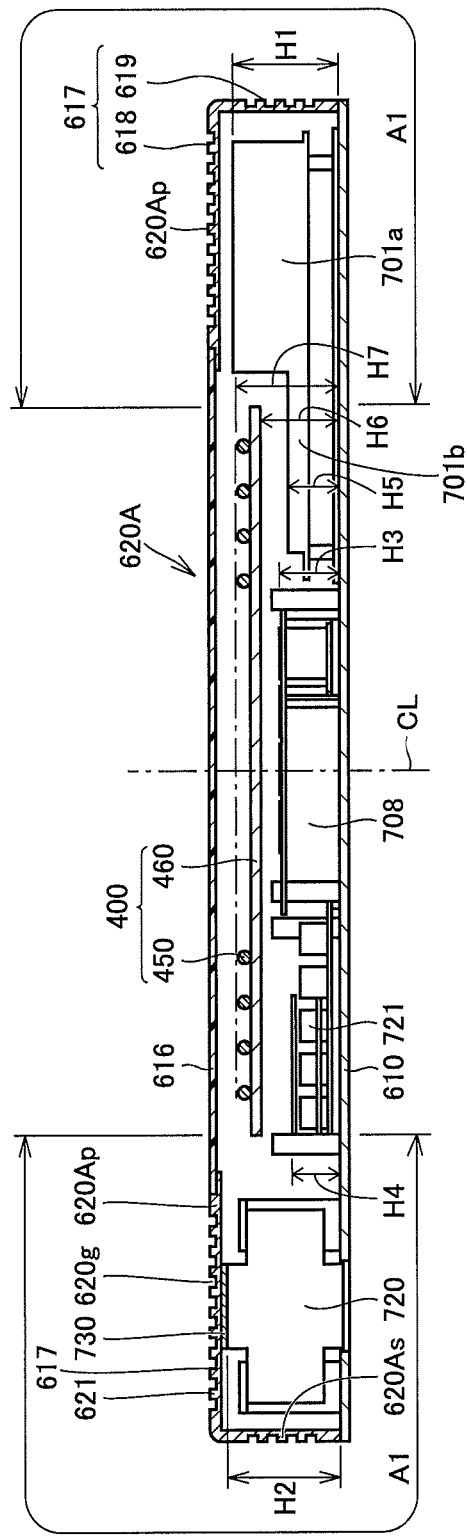
FIG. 11 is a sectional view taken along a line XI-XI in FIG. 10.
Figure 12:
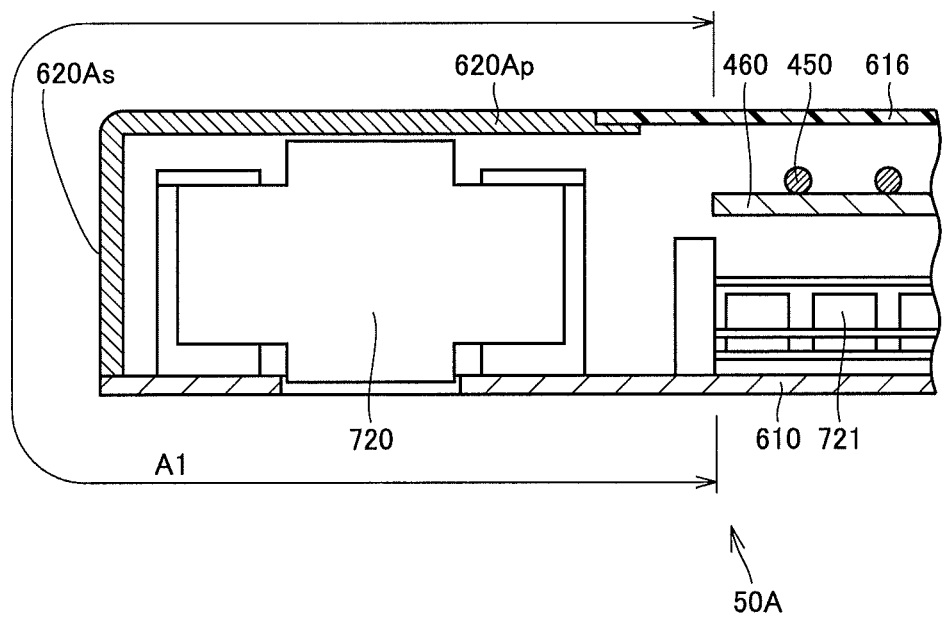
FIG. 12 is an enlarged partially sectional view of another mode of the power transmission device in the second embodiment.

With reference to FIGS. 10 to 12, a power transmission device 50A according to this embodiment will be now described. FIG. 10 is a plan view of power transmission device 50A in this embodiment, FIG. 11 is a sectional view taken along a line XI-XI in FIG. 10, and FIG. 12 is an enlarged partially sectional view of another mode of power transmission device 50A in this embodiment.

An internal mechanism of power transmission device 50A according to this embodiment is the same as that of the above first embodiment, and is different in a configuration of a housing 600A employed in this embodiment. A heating value of the first devices disposed around a power transmission unit 400 is sometimes larger than a heating value of the second devices disposed between power transmission unit 400 and a bottom plate 610. For example, a heating value of a high part 701a of a switching power supply 701 configuring an AC/DC unit, and a heat sink 713, filter inductors 716, 717, 720, and the like configuring a filter unit is larger than the heating value of the second devices disposed between power transmission unit 400 and bottom plate 610.

With reference to FIGS. 10 and 11, in power transmission device 50A according to this embodiment, heights H1 and H2 of first devices 702a and 720 from bottom plate 610 are higher than a height H7 of an upper surface of power transmission unit 400 from bottom plate 610. The upper surface of power transmission unit 400 means an upper end of power transmission coil 450. For example, height H2 is set to be higher than height H7 by about 5 mm or more and about 10 mm or less.

Housing 600A includes bottom plate 610 and a cover case 615. Cover case 615 includes a resin cover 616 disposed above power transmission unit 400, and metal covers 617 provided at adjacent positions in a width direction W of a vehicle with respect to resin cover 616. In this embodiment, metal covers 617 are disposed on both sides in width direction W with respect to resin cover 616.

Metal covers 617 each include an upper wall 618 covering upper surfaces of first devices 702a and 720, a side wall 619 covering side surfaces of first devices 702a and 720, and is formed of, for example, a metal material such as aluminum. First devices 702a and 720 are covered with metal covers 617 to be protected, and therefore even when a vehicle treads metal covers 617, a large load can be inhibited from being applied to first devices 702a and 720.

A position of the upper surface of power transmission unit 400 is lower than a position of the upper surface of each of first devices 702a and 720, and therefore when metal covers 617 are trod, a large load is inhibited from being applied to power transmission unit 400. A length in width direction W of each of upper walls 618 is, for example, between about 180 mm and about 250 mm, inclusive, and a width of each upper wall 618 is formed to have at least a width of a general wheel. Consequently, even when the vehicle runs on power transmission device 50, wheels can be inhibited from pressing resin cover 616, and an excessive load can be inhibited from being applied to power transmission unit 400.

Two metal covers 617 are provided on both end sides in width direction W of power transmission device 50, and formed so as to extend in a longitudinal direction of the vehicle. Therefore, even when the wheels run on from the vicinity of a corner in width direction W that is an front end of power transmission device 50, and further moves, metal covers 617 can protect the first devices.

Housing 600A employs a cooling structure in which the first devices are held between a bottom plate 610 side of the first devices and a front surface 621 side opposite to bottom plate 610. An area where the first devices are held between bottom plate 610 side and front surface 621 side coincides with an area around power transmission unit 400, and the cooling structure is employed in each area A1 of FIG. 11.

Specifically, the cooling structure is formed by upper walls 618 of metal covers 617, side walls 619 of metal covers, and bottom plate 610. An aluminum plate excellent in heat radiation characteristics is used as bottom plate 610, and the first devices are mounted on bottom plate 610. Consequently, heat from the first devices having a large heating value is radiated from upper walls 618 to the outside, and heat is further satisfactorily radiated from bottom plate 610 that is a mounting surface for the first devices. Thus, metal covers 617 each have both a protective function of protecting the first devices, and a cooling function of the first devices.

In front surface areas 620Ap located around power transmission unit 400 in outer surfaces of metal covers 617, unevenness structures are formed by a plurality of grooves 620g. That is, grooves 620g are formed by upper walls 618 and side walls 619 of metal covers 617. Grooves 620g are formed so as to extend in a direction F as shown in FIG. 10. Grooves 620g are provided, so that a surface area of a cover 620A is enlarged, and a contact area with the air is increased. Consequently, it is possible to enhance a heat radiation effect. In this embodiment, in order to facilitate heat radiation from the first devices, a heat radiation heat 730 having a sufficient heat transfer characteristic is interposed between an upper surface of filter inductor 720 being an example of the first device, and a lower surface of front surface area 620Ap of cover 620A.

Furthermore, in this embodiment, unevenness structures using a plurality of grooves 620*g* are formed not only in a front surface side and a rear surface side of the first devices located around power transmission unit 400 but also in side surface areas 620As of cover 620A.

Thus, in cover 620A of power transmission device 50A according to this embodiment, the aluminum plate is used as bottom plate 610, the unevenness structures in which a plurality of grooves 620*g* are also formed on the surfaces of aluminum plates in front surface areas 620Ap on a front surface side and side surface areas 620As are employed. Consequently, it is possible to effectively discharge head radiated from the first devices to the outside. As a result, it is possible to inhibit temperature rise of the first devices disposed around power transmission unit 400.

In this embodiment, the aluminum materials having sufficient heat radiation characteristics are used, unevenness shapes in which the plurality of grooves 620*g* are formed are provided on the front surface side and the side surface sides, and heat radiation sheet 730 is furthermore used. However, the present invention is not limited to this configuration.

As shown in FIG. 12, it is possible to enhance heat radiation performance, and to inhibit temperature rise of the first devices located around power transmission unit 400, by providing only a flat aluminum plate without providing grooves 620*g* in front surface areas 620Ap on the front surface side and side surface areas 620As. Any other materials having sufficient heat radiation characteristics may be used, and the material is not limited to an aluminum material.

Third Embodiment

Figure 13:
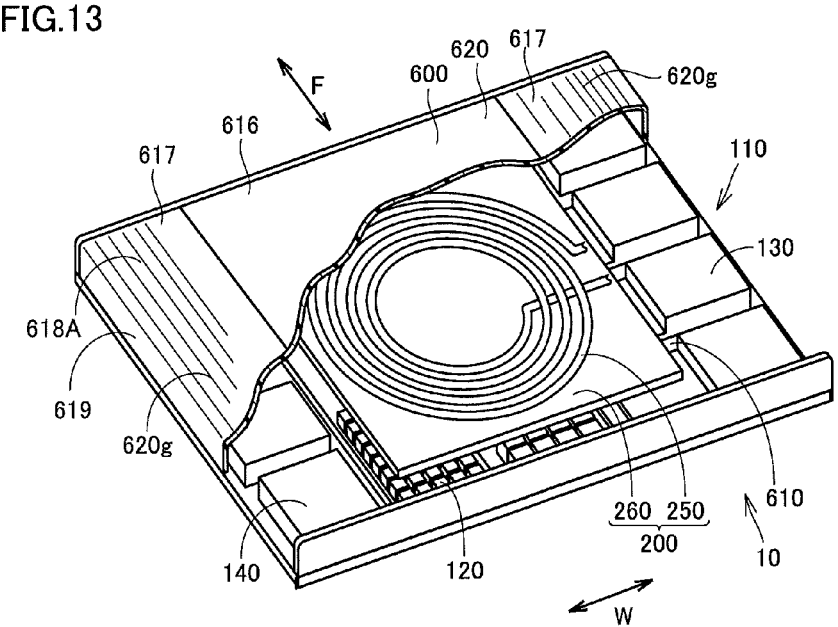
FIG. 13 is a perspective view showing a configuration of a power receiving device employing a spiral type coil, in a third embodiment.
Figure 14:
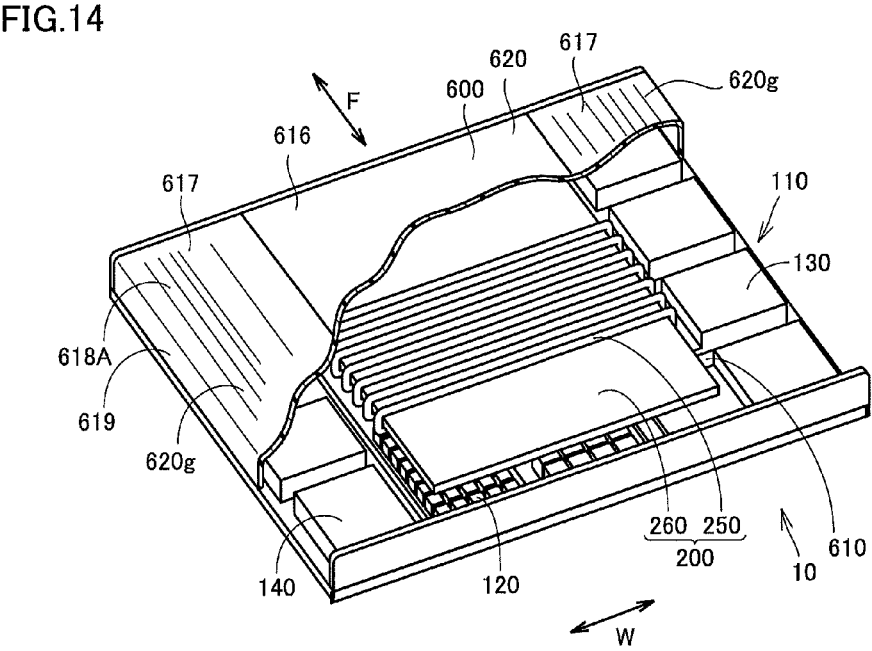
FIG. 14 is a perspective view showing a configuration of a power receiving device employing a wound type coil, in the third embodiment.

With reference to FIGS. 13 and 14, a configuration of a power receiving device 10 will be described as a third embodiment. FIG. 13 is a perspective view showing a configuration of a power receiving device 10 employing a spiral type power receiving coil 250, and FIG. 14 is a perspective view showing a configuration of a power receiving device 10 employing a wound type power receiving coil 250. Power receiving device 10 in each of FIGS. 13 and 14 is illustration of a state where a facility side in a case where power receiving device 10 is mounted in a vehicle is an upper side (illustration of a state turned upside down). Accordingly, the top in the drawing is a lower side (ground side) in the following description.

Power receiving device 10 basically has a configuration similar to the configurations of the above power transmission devices 50 and 50A, and has a power receiving unit 200 for receiving power from power transmission device 50 in a noncontact manner, an apparatus unit 110 provided between power receiving unit 200 and a battery 15 for storing power received by power receiving unit 200. Power receiving unit 200 and apparatus unit 110 are housed in any of housings 600 and 600A having configurations similar to the housings used in the above power transmission devices 50 and 50A. Accordingly, power receiving device 10 according to this embodiment has a configuration in which power receiving unit 200 and apparatus unit 100 are integrated.

Apparatus unit 110 has a capacitor 120, a rectifier 130, a DC/DC converter 140, and the like. First devices disposed around power receiving unit 200 are rectifier 130, DC/DC converter 140, and the like, and second devices disposed between power receiving unit 200 and a bottom plate 610 of housing 600 are capacitor 120 and the like.

The first devices disposed around power receiving unit 200 and the second devices disposed between power receiving unit 200 and a bottom plate 610 of housing 600, described above, are each an example, and are changed in accordance with a specification required for power receiving unit 200.

Thus, heights of the first devices disposed around power receiving unit 200 (distances from bottom plate 610 to lower surfaces of the first devices) are higher (longer) than heights of the second devices disposed between power receiving unit 200 and bottom plate 610 of housing 600 (distance from bottom plate 610 to lower surfaces of the second devices). Consequently, power receiving unit 200 disposed on a lower surface side of the second devices can be inhibited from protruding downward, difference (unevenness) between the heights of the devices housed in housing 60 is reduced, and a thin flat shape of the whole of housing 600 can be employed.

As a result, even in a case where power receiving device 10 is mounted on a vehicle side, it is possible to reduce a protruding amount of power receiving unit 200 from the vehicle side to the lower side (power transmission side). Consequently, power receiving unit 200 can be inhibited from coming into contact with unevenness (e.g., railroad crossing) on the ground, a falling object on the ground, or other obstacle, and contact force can be inhibited from concentrating even in a case where power receiving unit 200 comes into contact with the unevenness or the like.

Similarly to a case of power transmission device 50 shown in FIG. 6, by employing the configuration in which the first devices disposed around power receiving unit 200 are disposed on both sides of power receiving unit 200 in a width direction of the vehicle (arrow W direction in the drawing) when viewed from an advancing direction of the vehicle (arrow F direction in the drawing), it is possible to easily align power receiving device 10 with power transmission device 50 when the vehicle is guided (driven) to power transmission device 50.

Similarly to a case of power transmission device 50 shown in FIGS. 7 to 9, in a case where wound type power receiving coil 250 is used, in the first devices disposed around power receiving unit 200, a height of each of the first devices located in a direction orthogonal to a winding axis A1 from bottom plate 610 of housing 600 is made higher than a height of each of the second devices from bottom plate 610 of housing 600, and a height of each of the first devices located in an axial direction of winding axis A1 from bottom plate 610 of housing 600 is made lower than a height from bottom plate 610 of housing 600 to a lower surface of a ferrite core 260.

Consequently, a magnetic flux M generated in wound type power receiving coil 250 is inhibited from interlinking with the first devices located in an F direction in the drawing, and temperatures of the first devices can be prevented from rising.

In power receiving device 10, lower surfaces of the first devices are located lower than a lower surface of power receiving unit 200. Also in power receiving device 10, housing 600 includes bottom plate 610, and a cover 620. Cover 620 includes a resin cover 616 disposed above power transmission unit 400, and metal covers 617 provided at adjacent positions in width direction W of the vehicle with respect to resin cover 616. Metal covers 617 each include a lower wall 618A covering the lower surfaces of the first devices, a side wall 619 covering side surfaces of the first devices 702a, 720, and is formed of, for example, a metal material such as aluminum.

Consequently, when a projection on the ground comes into contact with power receiving device 10, the first devices are protected by metal covers 617, and therefore the first devices can be inhibited from being damaged. Furthermore, the lower surface of power receiving unit 200 is located above the lower surfaces of the first devices and lower surfaces of metal covers 617, and therefore a large load can be inhibited from being applied to power receiving unit 200.

Also in power receiving device 10, a cooling structure in which the first devices are cooled from upper and lower surfaces by lower walls 618A and bottom plate 610 is formed. Both lower walls 618A and side walls 619 are formed with grooves 620g (unevenness structure) extending in a direction F. Grooves 620g improve a cooling efficiency.

Also in power receiving device 10, since a heating value of the first devices disposed around power receiving unit 200 is larger than a heating value of the second devices disposed between power receiving unit 200 and bottom plate 610 of housing 600, the cooling structure shown in FIGS. 10 to 12 is applied to housing 600, so that heat radiated from the first devices can be effectively discharged to the outside. As a result, temperatures of the first devices located around power receiving unit 200 can be inhibited from rising.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power transmission device for transmitting power to a power receiving device in a noncontact manner, comprising:
    a power transmission unit, including a ferrite core and a power transmission coil, for transmitting power to said power receiving device in a noncontact manner;
    a power supply unit, connected to an external power supply, for supplying power to said power transmission unit; and
    a housing housing said power transmission unit and said power supply unit, wherein
    said power supply unit includes first devices disposed around said power transmission unit, and a second device disposed between said power transmission unit and a bottom surface of said housing, in a state where said power transmission unit and said power supply unit are mounted on said bottom surface of said housing, and
    a height of each of said first devices from said bottom surface of said housing is higher than a height of said second device from said bottom surface of said housing.

2. The power transmission device according to claim 1, wherein
    said power transmission device transmits power to said power receiving device in a state of facing said power receiving device mounted on a vehicle,
    the height of each of said first devices from said bottom surface of said housing is higher than a height of said power transmission unit from said bottom surface of said housing,
    said first devices are disposed adjacent to each other on both sides in a width direction of said vehicle with respect to said power transmission unit, in a state where said power transmission device and said power receiving device face each other, and
    said housing includes metal covers disposed so as to cover upper surfaces and side surfaces of said first devices.

3. The power transmission device according to claim 1, wherein
    a heating value of said first devices disposed around said power transmission unit is larger than a heating value of the second device disposed between said power transmission unit and said bottom surface of said housing, and
    said housing includes a cooling structure in which said first devices are held between a side of said bottom surface of said housing, and a side of a front surface of said housing opposite to said bottom surface.

4. The power transmission device according to claim 3, wherein
    said housing includes metal covers disposed so as to cover said first devices, and a metal bottom plate mounted with said first devices,
    said metal covers have upper walls to radiate heat from upper surfaces of said first devices, and
    said cooling structure is formed by said metal cover and said bottom plate, and said metal cover is formed with an unevenness structure.

5. The power transmission device according to claim 1, wherein
    said first devices disposed around said power transmission unit are disposed on both sides of said power transmission unit in a width direction of a vehicle when viewed in an entry direction of the vehicle.

6. The power transmission device according to claim 1, wherein
    said ferrite core is formed in a plate shape, and said power transmission coil is formed so as to be wound around said ferrite core about a winding axis, and
    in said first devices disposed around said power transmission unit,
    a height of each of said first devices located in a direction orthogonal to said winding axis from said bottom surface of said housing is made higher than a height of said second device from said bottom surface of said housing, and
    a height of each of said first devices located in an axial direction of said winding axis from said bottom surface of said housing is made lower than a height from said bottom surface of said housing to a lower surface of said ferrite core.

7. A power receiving device for receiving power from a power transmission device in a noncontact manner, comprising:
    a power receiving unit, including a ferrite core and a power receiving coil, for receiving power from said power transmission device in a noncontact manner;
    an apparatus unit provided between said power receiving unit, and a power storage device for storing power received by said power receiving unit; and
    a housing housing said power receiving unit and said apparatus unit, wherein
    said apparatus unit includes first devices disposed around said power receiving unit, and a second device disposed between said power receiving unit and a bottom surface of said housing, in a state where said power receiving unit and said apparatus unit are mounted on said bottom surface of said housing, and a height of each of said first devices from said bottom surface of said housing is higher than a height of said second device from said bottom surface of said housing.

8. The power receiving device according to claim 7, wherein said power transmission device transmits power to said power receiving device in a state of facing said power receiving device mounted on a vehicle, the height of each of said first devices from said bottom surface of said housing is higher than a height of said power receiving unit from said bottom surface of said housing, said first devices are disposed adjacent to each other on both sides in a width direction of said vehicle with respect to said power receiving unit, in a state where said power receiving device and said power transmission device face each other, and said housing includes metal covers disposed so as to cover upper surfaces and side surfaces of said first devices.

9. The power receiving device according to claim 8, wherein a heating value of said first devices disposed around said power receiving unit is larger than a heating value of the second device disposed between said power receiving unit and said bottom surface of said housing, and said housing includes a cooling structure in which said first devices are held between a side of said bottom surface and a side of a front surface opposite to said bottom surface.

10. The power receiving device according to claim 9, wherein said housing includes metal covers disposed so as to cover said first devices, and a metal bottom plate mounted with said first devices, said metal covers have lower walls to radiate heat from lower surfaces of said first devices, and said cooling structure is formed by said metal cover and said bottom plate, and said metal cover is formed with an unevenness structure.

11. The power receiving device according to claim 8, wherein said first devices disposed around said power receiving unit are disposed on both sides of the power receiving unit in a width direction of a vehicle when viewed in an advancing direction of the vehicle installed with the power receiving device.

12. The power transmission device according to claim 8, wherein said ferrite core is formed in a plate shape, and said power receiving coil is formed so as to be wound around said ferrite core about a winding axis, and in said first devices disposed around said power receiving unit, a height of each of said first devices located in a direction orthogonal to said winding axis from said bottom surface of said housing is made higher than a height of said second device from said bottom surface of said housing, and a height of each of said first devices located in an axial direction of said winding axis from said bottom surface of said housing is made lower than a height from said bottom surface of said housing to a lower surface of said ferrite core.

* * * * *